US010823405B2

(12) United States Patent
Alekseev et al.

(10) Patent No.: US 10,823,405 B2
(45) Date of Patent: Nov. 3, 2020

(54) OXY-FUEL COMBUSTION AND POWER GENERATION SYSTEM

(71) Applicant: LINDE AKTIENGESELLSCHAFT, Munich (DE)

(72) Inventors: Alexander Alekseev, Wolfratshausen (DE); Stevan Jovanovic, North Plainfield, NJ (US)

(73) Assignee: Linde Aktiengesellschaft, Munich (DE)

( * ) Notice: Subject to any disclaimer, the term of this patent is extended or adjusted under 35 U.S.C. 154(b) by 124 days.

(21) Appl. No.: 15/773,299

(22) PCT Filed: Jan. 31, 2017

(86) PCT No.: PCT/US2017/015784
§ 371 (c)(1),
(2) Date: May 3, 2018

(87) PCT Pub. No.: WO2017/164988
PCT Pub. Date: Sep. 28, 2017

(65) Prior Publication Data
US 2019/0003708 A1 Jan. 3, 2019

Related U.S. Application Data

(60) Provisional application No. 62/310,964, filed on Mar. 21, 2016.

(51) Int. Cl.
F01K 23/06 (2006.01)
F23L 7/00 (2006.01)
(Continued)

(52) U.S. Cl.
CPC ............ F23L 7/007 (2013.01); F01K 17/025 (2013.01); F01K 23/10 (2013.01); F22B 35/00 (2013.01);
(Continued)

(58) Field of Classification Search
CPC . F01K 23/10; F01K 23/06; F22D 1/00; F22D 1/006
See application file for complete search history.

(56) References Cited

U.S. PATENT DOCUMENTS 6,898,936 B1    5/2005  Ochs et al.
2009/0293782 A1* 12/2009  Eriksson ............... F22B 35/002
                                                110/205

(Continued)

OTHER PUBLICATIONS

International Search Report for PCT/US2017/015784, dated Apr. 5, 2017, Authorized Officer: Shane Thomas, 1 page.
(Continued)

Primary Examiner — Gregory A Wilson
(74) Attorney, Agent, or Firm — Millen White Zelano & Branigan, PC; Brion P. Heaney

(57) ABSTRACT

Integration of an oxyfuel combustion boiler at elevated pressures and a heat exchanger is achieved to produce carbon dioxide by feeding flue gas comprising carbon dioxide and water from the oxyfuel combustion boiler to a direct contact cooler column wherein water is condensed at a temperature of 0 to 10° C. lower than its dew point; feeding a portion of the condensed water from the direct contact cooler column to the oxyfuel combustion boiler; feeding a portion of the carbon dioxide from the direct contact cooler column to the oxyfuel combustion boiler; and recovering a portion of the carbon dioxide from the direct contact cooler column.

24 Claims, 1 Drawing Sheet

(51) Int. Cl.
      *F23C 9/08*       (2006.01)
      *F22B 35/00*     (2006.01)
      *F01K 23/10*     (2006.01)
      *F01K 17/02*     (2006.01)

(52) U.S. Cl.
      CPC .............. *F22B 35/007* (2013.01); *F23C 9/08* (2013.01); *F23L 2900/07005* (2013.01); *Y02E 20/34* (2013.01)

(56) References Cited

U.S. PATENT DOCUMENTS

| | | | |
|---|---|---|---|
| 2010/0326084 A1* | 12/2010 | Anderson | F01K 23/10 60/775 |
| 2011/0011315 A1* | 1/2011 | Hayashi | F23C 9/003 110/345 |
| 2012/0129112 A1* | 5/2012 | Cegarra Cruz | F01K 17/06 431/11 |
| 2014/0007576 A1* | 1/2014 | Alekseev | F01K 17/06 60/648 |
| 2016/0033128 A1* | 2/2016 | Stuxberg | F01K 23/10 60/645 |

OTHER PUBLICATIONS

Shrikar Chakravarti et al, Advanced Technology for the Capture of Carbon Dioxide from Flue Gases, First National Conf. on Carbon Sequestration, May 15-17, 2001, Washington DC.

\* cited by examiner

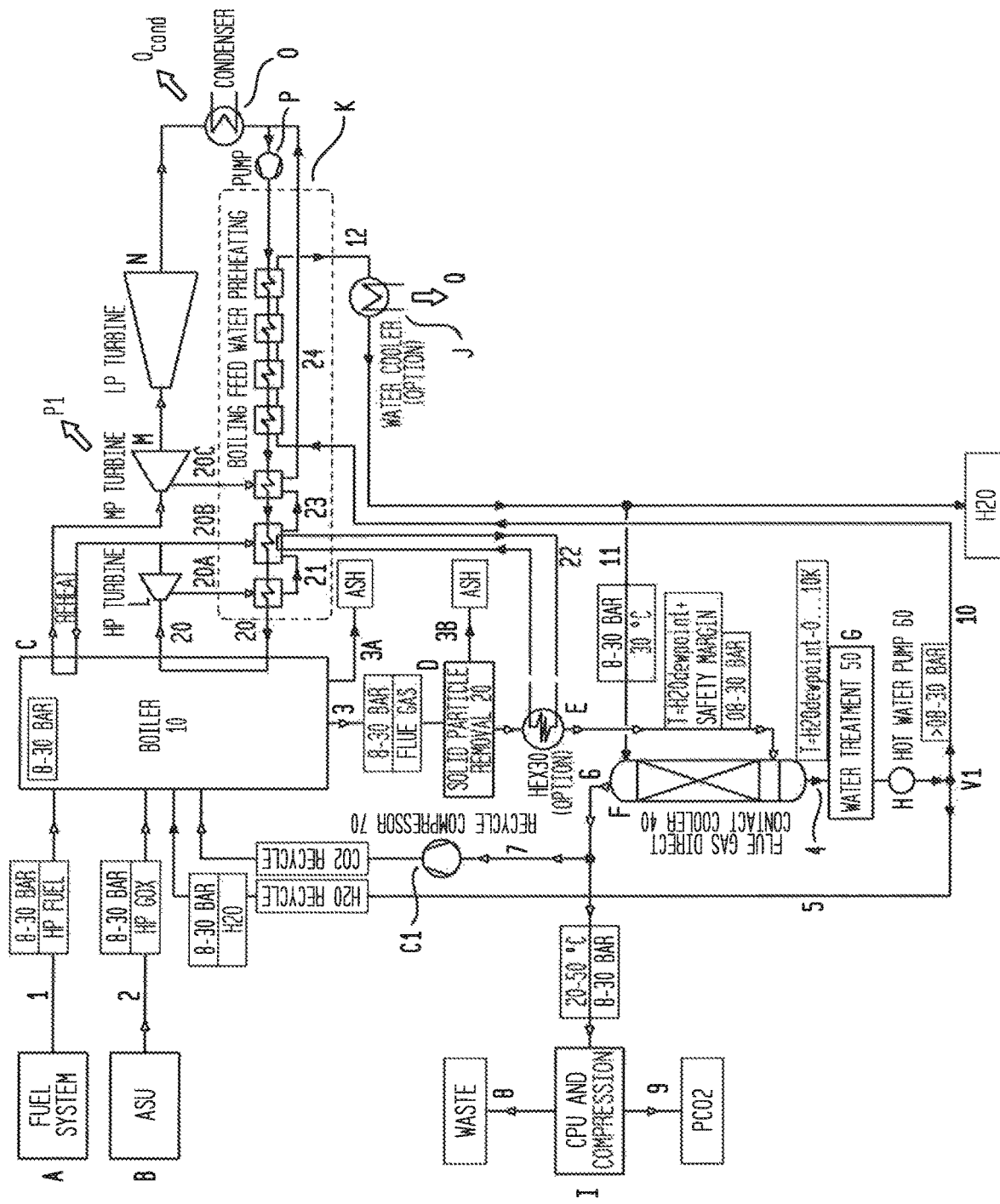

OXY-FUEL COMBUSTION AND POWER GENERATION SYSTEM

STATEMENT REGARDING FEDERALLY SPONSORED RESEARCH OR DEVELOPMENT

This invention was made with government support under Contract DE-FE0009448 awarded by the US Department of Energy. The government has certain rights in the invention.

BACKGROUND OF THE INVENTION

The use of cleaner, more efficient power generation systems has been on the rise for reasons of economics and environmental impact. One of the classes of clean energy generation system is the oxy-fuel combustion boiler. A variety of fuel classes can be used for oxy-fuel combustion, starting with different grades of coal, through liquid fuels to many different gaseous hydrocarbon fuels such as natural gas. With any of the aforementioned fuels, the oxy-fuel combustion process generates a flue gas stream that is rich in carbon dioxide and water vapor while releasing a high amount of heat which is used to generate power via steam turbine systems.

Many of the elements of oxy-fuel combustion systems resemble common unit operations that are found in commercially utilized air based combustion boilers. For example are the separation unit from the fuel combustor which provides oxygen for the oxy-fuel combustion along with a carbon dioxide recirculation system, which moderates the oxy-fuel combustion temperature to fit selected material temperature limitations. Waste heat recovery from the flue gas from the combustion is an option which is characterized by a significant content of water vapor. The water vapor can release significant amounts of heat if water condensation is considered as an option.

The oxy-combustion process can be carried out at significantly higher than atmospheric pressure. This offers the advantage of reduced capital investment due to reduced equipment size caused by the smaller actual volumetric flue gas flow rates and increased heat and mass transfers' coefficients to utilize heat exchangers for steam generation. A significant additional heat could be recovered at this higher atmospheric pressure and utilized for increased power generation by condensing most of the water vapor from the flue gas.

A condensing, two-phase heat exchanger can be utilized for this purpose. However, most of the fuels used contain corrosive contaminants such as sulfur which then requires the utilization of expensive, corrosion resistant alloy materials along with carefully maintained operation conditions. This will significantly increase the capital investment and imposes significant monetary penalties for improved power generation which will consequently result in the increased cost of incrementally increased power production.

Compared to state of the art oxy-fuel power generation systems, significantly improved capital costs and process performance indicators can be achieved due to reduced corrosion from the acid condensation phenomena. Reduced cost for condensing heat exchanger systems. Increased power generation efficiency is achieved and reduced cost of electricity.

The integration of the condensing heat works better for "elevated pressure" oxyfuel processes because condensing heat becomes more valuable. Typically though the integration of low-value heat into a process has minor impact on overall efficiency only but requires considerable investment in hardware. Further, the flue gas still consists of significant amounts of water which requires additional power for downstream removal.

Some elevated pressure processes require the flue gas to be condensed in a special heat exchanger, which can be problematic due to acid corrosion issues.

Very high pressure oxyfuel processes are not efficient processes. High pressure oxygen will be required for combustion and thereby needs to be compressed. This compression up to 140 bar is a very power consuming process.

Typically too, the flue gas from the boiler outlet is cooled, water is condensed and removed and a part of the remaining gas consisting mostly of carbon dioxide is recycled back to the combustion unit for temperature control. This recycling of carbon dioxide dilutes the flue gas from the boiler, the concentration of the carbon dioxide increases and the concentration of water decreases reducing the partial pressure of water and lower dew point of the flue gas. This reduces the thermodynamic value of condensing heat because the temperature of this heat decreases.

The inventors have discovered that the use of the direct contact cooler column for condensing purposes provides advantages over previous processes where it was used for the removal of impurities. By keeping the temperature of condensed water in the sump of the direct contact cooler column as high as possible (i.e. close to the dew point as possible, and avoiding subcooling of this liquid, performance is improved.

SUMMARY OF THE INVENTION

In one embodiment of the invention there is disclosed a method for operating an oxyfuel combustion boiler at an elevated pressure of 8 to 30 bar comprising the steps:
feeding flue gas comprising carbon dioxide and water from the oxyfuel combustion boiler to a direct contact cooler column wherein water is condensed at a temperature of 0 to 10° C. lower than its dew point;
feeding a portion of the condensed water from the direct contact cooler column to the oxyfuel combustion boiler;
feeding a portion of the carbon dioxide from the direct contact cooler column to the oxyfuel combustion boiler; and
recovering a portion of the carbon dioxide from the direct contact cooler column.

The pressure of the oxyfuel combustion boiler can also be from 8 to 20 bar. The water in the direct contact cooler column can be condensed at a temperature of 0 to 5° C. lower than its dew point.

The method further comprises a boiler feed water preheating unit. A portion of the water from the direct contact cooler column can be fed to the boiler feed water preheating unit.

The carbon dioxide that is recovered can be compressed.

The carbon dioxide and water can be fed to a solid particle removal unit prior to entering the direct contact cooler column. The carbon dioxide and water can be fed to a heat exchanger prior to entering the direct contact cooler column.

The boiler is in fluid thermal communication with the boiler feed water preheating unit. Water from the boiler feed water preheating unit is fed from the boiler to a compressor and a condenser before being fed into the boiler feed water preheating unit.

The carbon dioxide that is recovered from the direct contact cooler column is typically at a temperature of 20 to 50° C. and a pressure of 8 to 30 bar.

The method may additionally comprise feeding cooled water from the boiler feed water preheating unit to the direct contact cooler column.

In another embodiment of the invention, there is disclosed a method for the production of carbon dioxide from an oxyfuel combustion boiler at an elevated pressure of 8 to 30 bar comprising the steps:
Feeding flue gas comprising carbon dioxide and water from the oxyfuel combustion boiler to a direct contact cooler column wherein water is condensed at a temperature 0 to 10° C. lower than its dew point;
feeding a portion of the condensed water from the direct contact cooler column to the oxyfuel combustion boiler;
feeding a portion of the carbon dioxide from the direct contact cooler column to the oxyfuel combustion boiler; and
recovering a portion of the carbon dioxide from the direct contact cooler column.

In yet another embodiment of the invention, there is disclosed an oxyfuel combustion boiler system comprising an oxyfuel combustion boiler, a direct contact cooler column, and a boiler feed water preheating unit.

In the system, the oxyfuel combustion boiler is in fluid communication with the direct contact cooler column. The boiler feed water preheating unit is in thermal communication with the oxyfuel combustion boiler.

The direct contact cooler column receives carbon dioxide and water from the oxyfuel combustion boiler. The direct contact cooler column feeds carbon dioxide to the oxyfuel combustion boiler and carbon dioxide compression unit.

The direct contact cooler column feeds water to the oxyfuel combustion boiler and the boiler feed water preheating unit.

BRIEF DESCRIPTION OF THE DRAWINGS

The FIGURE is a schematic of an oxy-fuel power generation plant integrated with a condensing heat exchanger system.

DETAILED DESCRIPTION OF THE INVENTION

The FIGURE is a schematic diagram of the high pressure oxyfuel process as defined by the invention.

A fuel such as a hydrocarbon like coal is fed from fuel system A through line 1 at a pressure of 8 to 30 bar into boiler C. Gaseous oxygen is fed from an air separation unit B through line 2 into the boiler C also at a high pressure of 8 to 30 bar. The fuel will combust in the presence of oxygen and will result in the generation of heat as well as a flue gas. This generated flue gas will be fed from the boiler C through line 3 at a pressure of 8 to 30 bar. A small amount of ash will also be produced by the reaction of the hydrocarbon and the oxygen and will be directed out of the boiler C through line 3A.

This flue gas is fed into sold particle removal unit D where a small amount of ash is further recovered and removed through line 3B. The flue gas will continue in line 3 through an optional heat exchanger E where it will be cooled down by contact with a cooler stream 22 from the boiler feed water preheating unit K.

The now cooler flue gas will enter the direct contact cooler column F where the flue gas will be further cooled. The temperature is approximately the water dew point while the pressure of the flue gas remains at 8 to 30 bar. The direct contact cooler column F will further cool the flue gas and separate out water that is present in the flue gas. The cooled flue gas will exit the direct contact cooler column F through line 6 where it will be fed at a temperature of 20° to 50° C. and a pressure of 8 to 30 bar to a CPU and compression unit I. This CPU and compression unit I will separate out carbon dioxide from the flue gas through line 9 where it will be recovered or treated and released to the atmosphere. The remainder of the flue gas will be fed through line 8 to a treatment unit if necessary for release into the atmosphere in an environmentally responsible manner.

The flue gas leaving the direct contact cooler column F will also be diverted from line 6 through line 7 where it will be fed into a recycle compressor C1. This gas stream which is primarily carbon dioxide will be fed from the recycle compressor C1 through line 7 for reentry back into the boiler C where the carbon dioxide will provide a further fuel for generating heat.

The direct contact cooler column F will separate water from the cooled flue gas. This water which is at a temperature will be fed from the direct contact cooler column F through line 4 where it will enter a water treatment unit G. This water treatment unit G will feed the treated water to a hot water pump H which will feed the water at a pressure of 8 to 30 bar to a three way valve V1.

The treated water will leave valve V1 through line 5 where it will be fed into the boiler C to supplement the water already present in the boiler C. The three way valve V1 will also feed the water through line 10 at a pressure of 8 to 30 bar into the boiler feed water preheating unit K. This water will enter the boiler feed water preheating unit and absorb heat from the unit. The now hot water will exit the unit through line 12 where it will be fed optionally to a water cooler J and ultimately disposed of. A line 11 diverts some of this water feed from line 12 and feeds at a pressure of 8 to 30 bar and a temperature of about 30° C. into the direct contact cooler column F to provide cooler water to contact the flue gas stream present therein.

The boiler feed water preheating unit K operates in conjunction with the boiler C to provide heat into the system and manage its application. Hot water from the boiler is fed through line 20 to a high pressure turbine L where it will be raised in pressure. Part of this higher pressure water is fed through line 20A back into the boiler feed water preheating unit K while the remainder continues through line 20. A further portion of this compressed water is fed through line 20B into the boiler feed water preheating unit K. The remainder passes through line 20 where it will re-enter the boiler C to capture more heat before being fed into a medium pressure turbine M. A portion of this water will be fed through line 20C to supplement the heat in the boiler feed water preheating unit K. The remainder will pass through line 20 to a low pressure turbine N which in turn will feed the pressurized hot water through a condenser O.

Line 20 will be diverted through a pump P which will direct the hot water into the boiler feed water preheating unit K. This water will pass through the length of the boiler feed water preheating unit K for reentry into the boiler C. The water will be cooled by this passage and will reenter the boiler where it will gather heat and begin the cycle through the high pressure turbine L anew.

Lines 21 and 23 show the interconnectivity of the units present in the boiler feed water preheating unit K where cool water is fed amongst the units. In particular, line 24 will direct cooler water back to pump P where it will enter the boiler feed water preheating unit K to be fed through line 20 back into the boiler C.

The present invention is therefore advantageous in that integration of the condensed hot water into the steam cycle for preheating of boiler feed water by means of water-water heat exchangers;

Recirculation of a fraction of condensed water to the boiler (water recycle additionally to $CO_2$ recycle) by means of a pump for temperature control in the boiler;

Water recycle to boiler helps to keep the temperature of the condensed heat as high as possible;

Optimal amount of water injected into the direct contact cooler column on the top has the same target;

Therefore condensed heat becomes valuable; integration of this heat has a positive impact on power produced by power plant;

An oxyfuel boiler producing carbon dioxide and water and steam and feeding same to a direct contact cooler column which will condense the steam which is integrated with a water-water heat exchanger which will receive the condensed steam from the direct contact cooler column and which is integrated with a steam turbine which will receive hot water from the water heat exchanger and receive steam from the steam turbine.

While this invention has been described with respect to particular embodiments thereof, it is apparent that numerous other forms and modifications of the invention will be obvious to those skilled in the art. The appended claims in this invention generally should be construed to cover all such obvious forms and modifications which are within the true spirit and scope of the invention.

Having thus described the invention, what we claim is:

1. A method for operating an oxyfuel combustion boiler comprising:
   combusting fuel in the presence of oxygen at a pressure of 8 to 30 bar in the oxyfuel combustion boiler to heat water, whereby the water is converted to steam for use in generating power in a steam turbine system, and to generate a flue gas comprising carbon dioxide and water;
   cooling the flue gas comprising carbon dioxide and water by heat exchange with a coolant stream that is then used to preheat boiler feed water in a boiler feed water preheating unit;
   feeding the cooled flue gas comprising carbon dioxide and water from the oxyfuel combustion boiler to a direct contact cooler column wherein water is condensed at a temperature of 0° to 10° C. lower than the dew point of the flue gas;
   removing the condensed water from the direct contact cooler column at a temperature which is 0° to 10° C. lower than the dew point of the flue gas;
   feeding a portion of the condensed water from the direct contact cooler column to the oxyfuel combustion boiler;
   feeding a portion of the carbon dioxide from the direct contact cooler column to the oxyfuel combustion boiler; and
   recovering a portion of the carbon dioxide from the direct contact cooler column.

2. The method as claimed in claim 1 wherein the pressure of the oxyfuel combustion boiler is from 8 to 20 bar.

3. The method as claimed in claim 1 wherein the water is condensed at a temperature of 0 to 5° C. lower than its dew point.

4. The method as claimed in claim 1 wherein a portion of the water removed from the direct contact cooler column is used in the boiler feed water preheating unit to preheat boiler feed water.

5. The method as claimed in claim 1, wherein, during recovery of the portion of the carbon dioxide, the carbon dioxide is compressed.

6. The method as claimed in claim 1, wherein the fuel gas comprising carbon dioxide and water is fed to a solid particle removal unit prior to entering the direct contact cooler column.

7. The method as claimed in claim 1, wherein the oxyfuel combustion boiler is in fluid thermal communication with the boiler feed water preheating unit.

8. The method as claimed in claim 1, wherein the water from the boiler feed water preheating unit that is heated in the oxyfuel combustion boiler to form the steam is fed from the oxyfuel combustion boiler to a condenser and a pump before being fed into the boiler feed water preheating unit.

9. The method as claimed in claim 1, wherein the carbon dioxide recovered from the direct contact cooler column is at a temperature of 20 to 50° C. and a pressure of 8 to 30 bar.

10. The method as claimed in claim 1 further comprising feeding cooled water from the boiler feed water preheating unit to the direct contact cooler column.

11. A method for the production of carbon dioxide from an oxyfuel combustion boiler at an elevated pressure of 8 to 30 bar comprising:
    combusting fuel in the presence of oxygen at a pressure of 8 to 30 bar in the oxyfuel combustion boiler to heat water, whereby the water is converted to steam for use in generating power in a steam turbine system, and to generate a flue gas comprising carbon dioxide and water;
    cooling the flue gas comprising carbon dioxide and water by heat exchange with a coolant stream that is then used to preheat boiler feed water in a boiler feed water preheating unit;
    feeding the cooled flue gas comprising carbon dioxide and water from the oxyfuel combustion boiler to a direct contact cooler column wherein water is condensed at a temperature 0° to 10° C. lower than the dew point of the flue gas;
    feeding a portion of the condensed water from the direct contact cooler column to the oxyfuel combustion boiler;
    feeding a portion of the carbon dioxide from the direct contact cooler column to the oxyfuel combustion boiler; and
    recovering a portion of the carbon dioxide from the direct contact cooler column.

12. The method as claimed in claim 11 wherein the pressure of the oxyfuel combustion boiler is from 8 to 20 bar.

13. The method as claimed in claim 11 wherein the water is condensed at a temperature of 0 to 5° C. lower than its dew point.

14. The method as claimed in claim 11, wherein a portion of the water removed from the direct contact cooler column is used in the boiler feed water preheating unit to preheat boiler feed water.

15. The method as claimed in claim 11, wherein, during recovery of the portion of the carbon dioxide, the carbon dioxide is compressed.

16. The method as claimed in claim 11, wherein the fuel gas comprising carbon dioxide and water is fed to a solid particle removal unit prior to entering the direct contact cooler column.

17. The method as claimed in claim 11, wherein the oxyfuel combustion boiler is in fluid communication with the boiler feed water preheating unit.

18. The method as claimed in claim 11, wherein the water from the boiler feed water preheating unit that is heated in the oxyfuel combustion boiler to form the steam is fed from the oxyfuel combustion boiler to a condenser and a pump before being fed into the boiler feed water preheating unit.

19. The method as claimed in claim 11 wherein the carbon dioxide recovered from the direct contact cooler column is at a temperature of 20 to 50° C. and a pressure of 8 to 30 bar.

20. The method as claimed in claim 11 further comprising feeding cooled water from the boiler feed water preheating unit to the direct contact cooler column.

21. An oxyfuel combustion boiler system comprising:
   an oxyfuel combustion boiler for combusting a fuel in the presence of oxygen to generate a flue gas comprising water and carbon dioxide,
   a boiler feed water preheating unit,
   a heat exchanger for cooling the flue gas comprising carbon dioxide and water by heat exchange with a coolant stream that is then used to preheat boiler feed water in the boiler feed water preheating unit,
   a direct contact cooler column for cooling the flue gas and condensing water from the flue gas at a temperature of 0° to 10° C. lower than the dew point of the water in the flue gas,
   a water recycle line for feeding a portion of the condensed water from the direct contact cooler column to the oxyfuel combustion boiler,
   a carbon dioxide recycle line for feeding a portion of the carbon dioxide from the direct contact cooler column to the oxyfuel combustion boiler, and
   a boiler feed water preheating unit.

22. The system as claimed in claim 21 wherein the boiler feed water preheating unit is in thermal communication with the oxyfuel combustion boiler.

23. The system as claimed in claim 21, further comprising a line for feeding carbon dioxide from the direct contact cooler column to a carbon dioxide compression unit.

24. The system as claimed in claim 21, further comprising a line for feeding water from the direct contact cooler column to the boiler feed water preheating unit.

* * * * *